(12) United States Patent
Browne et al.

(10) Patent No.: US 10,243,827 B2
(45) Date of Patent: Mar. 26, 2019

(54) TECHNIQUES TO USE A NETWORK SERVICE HEADER TO MONITOR QUALITY OF SERVICE

(71) Applicant: Intel Corporation, Santa Clara, CA (US)

(72) Inventors: Rory Browne, Limerick (IE); Andrey Chilikin, Limerick (IE)

(73) Assignee: Intel Corporation, Santa Clara, CA (US)

( * ) Notice: Subject to any disclaimer, the term of this patent is extended or adjusted under 35 U.S.C. 154(b) by 190 days.

(21) Appl. No.: 15/275,833

(22) Filed: Sep. 26, 2016

(65) Prior Publication Data
US 2018/0091410 A1 Mar. 29, 2018

(51) Int. Cl.
- *H04L 12/24* (2006.01)
- *H04L 12/26* (2006.01)
- *H04L 29/06* (2006.01)
- *H04L 12/851* (2013.01)

(52) U.S. Cl.
CPC .......... *H04L 43/10* (2013.01); *H04L 41/5009* (2013.01); *H04L 47/24* (2013.01); *H04L 69/22* (2013.01)

(58) Field of Classification Search
None
See application file for complete search history.

(56) References Cited

U.S. PATENT DOCUMENTS

| | | | |
|---|---|---|---|
| 2006/0215577 A1 | 9/2006 | Guichard et al. | |
| 2012/0155298 A1* | 6/2012 | Yang | H04W 24/08 370/252 |
| 2014/0362682 A1 | 12/2014 | Guichard et al. | |
| 2015/0124815 A1 | 5/2015 | Beliveau et al. | |
| 2015/0195197 A1 | 7/2015 | Yong et al. | |
| 2015/0263894 A1* | 9/2015 | Kasturi | H04L 41/0806 709/222 |
| 2016/0099853 A1 | 4/2016 | Nedeltchev et al. | |
| 2016/0142282 A1* | 5/2016 | Guo | H04L 12/6418 370/392 |
| 2016/0142321 A1* | 5/2016 | Gage | H04W 4/70 370/235 |
| 2017/0048815 A1* | 2/2017 | Clarke | H04W 64/00 |
| 2017/0208011 A1* | 7/2017 | Bosch | H04L 47/25 |

(Continued)

OTHER PUBLICATIONS

Browne, R. "Network Service Header Timestamping", Jun. 1, 2016; Network Working Group, p. 1-20.*

(Continued)

*Primary Examiner* — Alpus Hsu
*Assistant Examiner* — Camquyen Thai
(74) *Attorney, Agent, or Firm* — Compass IP Law PC

(57) ABSTRACT

Examples include techniques to use a network service header to monitor Quality of Service (QoS). Examples include implementation of a QoS stamping policy to monitor one or more QoS fields of a network packet routed through nodes arranged to separately provide individual service functions included in a service function chain. A determination is made as to whether the QoS stamping information indicates a consistent QoS configuration in the one or more QoS fields of the network packet at node ingress or node egress of the network packet as routed through the nodes.

29 Claims, 14 Drawing Sheets

_600_

PROVIDE A QoS STAMPING POLICY TO AN SFC CLASSIFIER TO CAUSE THE SFC CLASSIFIER TO GENERATE AN NSH THAT INCLUDES METADATA TYPE 2, THE METADATA TYPE 2 TO INCLUDE QoS STAMPING INFORMATION INSERTED BY NODES ARRANGED TO SEPARATELY PROVIDE INDIVIDUAL SFS INCLUDED IN THE SFC
_602_

AACCESS A DATABASE ARRANGED TO STORE QoS STAMPING INFORMATION INSERTED BY THE NODES SEPARATELY ARRANGED TO PROVIDE INDIVIDUAL SFS IN THE SFC, THE QoS STAMPING INFORMATION TO BE GATHERED ACCORDING TO THE QoS STAMPING POLICY AS THE NETWORK PACKET IS ROUTED THROUGH THE NODES
_604_

DETERMINE WHETHER THE QoS STAMPING INFORMATION INDICATES A CONSISTENT QoS CONFIGURATION IN THE ONE OR MORE QoS FIELDS OF THE NETWORK PACKET AT NODE INGRESS OR NODE EGRESS OF THE NETWORK PACKET AS ROUTED THROUGH THE NODES
_606_

(56) References Cited

U.S. PATENT DOCUMENTS

2017/0237656 A1* 8/2017 Gage ...................... H04L 45/74
                                                    370/392
2017/0251065 A1* 8/2017 Furr ...................... H04L 67/16
2017/0264537 A1* 9/2017 Patil ..................... H04L 45/566

OTHER PUBLICATIONS

International Search Report and Written Opinion for PCT Patent Application No. PCT/US2017047909, dated Nov. 29, 2017, 17 pages.

* cited by examiner

*600*

PROVIDE A QoS STAMPING POLICY TO AN SFC CLASSIFIER TO CAUSE THE SFC CLASSIFIER TO GENERATE AN NSH THAT INCLUDES METADATA TYPE 2, THE METADATA TYPE 2 TO INCLUDE QoS STAMPING INFORMATION INSERTED BY NODES ARRANGED TO SEPARATELY PROVIDE INDIVIDUAL SFS INCLUDED IN THE SFC
*602*

AACCESS A DATABASE ARRANGED TO STORE QoS STAMPING INFORMATION INSERTED BY THE NODES SEPARATELY ARRANGED TO PROVIDE INDIVIDUAL SFS IN THE SFC, THE QoS STAMPING INFORMATION TO BE GATHERED ACCORDING TO THE QoS STAMPING POLICY AS THE NETWORK PACKET IS ROUTED THROUGH THE NODES
*604*

DETERMINE WHETHER THE QoS STAMPING INFORMATION INDICATES A CONSISTENT QoS CONFIGURATION IN THE ONE OR MORE QoS FIELDS OF THE NETWORK PACKET AT NODE INGRESS OR NODE EGRESS OF THE NETWORK PACKET AS ROUTED THROUGH THE NODES
*606*

*FIG. 6*

Storage Medium 700

Computer Executable
Instructions for 600

RECEIVE A QoS STAMPING POLICY FOR MONITORING ONE OR MORE QoS FIELDS OF A NETWORK PACKET ROUTED THROUGH NODES SEPARATELY PROVIDING INDIVIDUAL SFS IN AN SFC.
902

GENERATE A NETWORK SERVICE HEADER (NSH) THAT INCLUDES METADATA TYPE 2 BASED ON THE QoS STAMPING POLICY, THE METADATA TYPE 2 TO INCLUDE QoS STAMPING INFORMATION INSERTED BY NODES ARRANGED TO SEPARATELY PROVIDE INDIVIDUAL SFS INCLUDED IN THE SFC
904

ENCAPSULATE THE NETWORK PACKET WITH THE GENERATED NSH
906

SEND THE NSH-ENCAPSULATED NETWORK PACKET TO A FIRST NODE OF THE NODES SEPARATELY PROVIDING INDIVIDUAL SFS IN THE SFC
908

*FIG. 9*

Storage Medium *1000*

Computer Executable
Instructions for 900

RECEIVE, AT A PROCESSOR CIRCUIT OF A NODE PROVIDING AN SF INCLUDED IN AN SFC, A NETWORK PACKET ENCAPSULATED WITH AN NSH THAT INCLUDES METADATA TYPE 2
1202

INSERT QoS STAMPING INFORMATION THAT INDICATES QoS CONFIGURATION INFORMATION FOR A QoS FIELD OF THE NETWORK PACKET AT INGRESS OR EGRESS OF THE NHS-ENCAPSULATED NETWORK PACKET
1204

DETERMINE WHETHER THE NODE IS THE LAST NODE IN THE SFC AND FORWARD THE NHS-ENCAPSULATED NETWORK PACKET WITH THE INSERTED QoS CONFIGURATION INFORMATION TO A NEXT NODE ARRANGED TO PROVIDE A DIFFERENT SF INCLUDED IN THE SFC IF THE NODE IS DETERMINED TO NOT BE THE LAST NODE IN THE SFC
1206

*FIG. 12*

Storage Medium *1300*

Computer Executable Instructions for *1200*

*FIG. 13*

TECHNIQUES TO USE A NETWORK SERVICE HEADER TO MONITOR QUALITY OF SERVICE

TECHNICAL FIELD

Examples described herein are generally related to use of a network service header to monitor quality of service for service function chains.

BACKGROUND

Service function chaining or a service function chains (SFCs) provide a mechanism that allow for an ability to define an ordered list of services (e.g., firewall (FW), virtual router (vRouter), network address translation (NAT), session border controller (SBC), video-optimizer (VO) or content distribution network (CDN)) which may be linked together in a network. An SFC may be advantageous to network service providers in that network traffic does not need to go through all available service functions. Rather, a selected chain of services from among available services may be linked to form the SFC. Also, new services may be added to the network with little to no effect on existing services.

BRIEF DESCRIPTION OF THE DRAWINGS

FIG. 6 illustrates an example of a first logic flow.
FIG. 7 illustrates an example of a first storage medium.
FIG. 9 illustrates an example of a second logic flow.
FIG. 10 illustrates an example of a second storage medium.
FIG. 12 illustrates an example of a third logic flow.
FIG. 13 illustrates an example of a third storage medium.

DETAILED DESCRIPTION

As contemplated in the present disclosure, an SFC may provide a mechanism that allows for an ability to define an ordered list of services including, but not limited to, FW, vRouter, NAT, SBC, VO or CDN services. Maintaining a consistent quality of service (QoS) configuration throughout a network that employs the use of SFCs may be a major operational headache for network operators or enterprises. These operational issues may be compounded via use of network function virtualization (NFV) infrastructure in a network. NFV may result in a network packet experiencing hops through nodes utilizing multiple technologies such as, but not limited to, technologies associated with $3^{rd}$ Generation Partnership Project (3GPP), general packet radio service (GPRS) tunneling protocol (GTP), Institute of Electrical and Electronics Engineers (IEEE) 802.11, IEEE 802.03, IEEE 802.1p, multiprotocol label switching (MPLS), transmission control protocol/Internet protocol (TCP/IP) or Internet protocol security (IPSec). The network packet may also experience hops through nodes associated with different vendor solutions that may include various types of physical resources (e.g., servers, memory, storage devices, switches, etc.) from a multitude of manufacturers.

In some examples, for a network packet that may hop through possibly multiple technologies or vendor solutions a need may exist to ensure that at least some QoS requirements or configurations are maintained as the network packet moves through each hop. For example, a high priority network packet may include QoS class identifier (QCI) bits for a 3GPP air interface hop, may include IEEE 802.1p bits for a virtual local access network (VLAN) hop, may include traffic class bits for an MPLS hop, may include differentiated services code point (DSCP) bits for an IPSec hop or may include tunnel endpoint ID (TEID) bits for a GTP hop. In many cases QoS may not be configured consistently in QoS fields as the network packet moves through these hops and inconsistencies may be compounded when multiple vendor solutions are used among multiple hops. Inconsistent QoS configurations may impact a subscriber's quality of experience (QoE) for a service provided by these multi-hop networks. Debugging QoS configuration inconsistencies in QoS fields in the network packet may be time intensive and difficult. It is with respect to these challenges that the examples described herein are needed.

Figure 1:
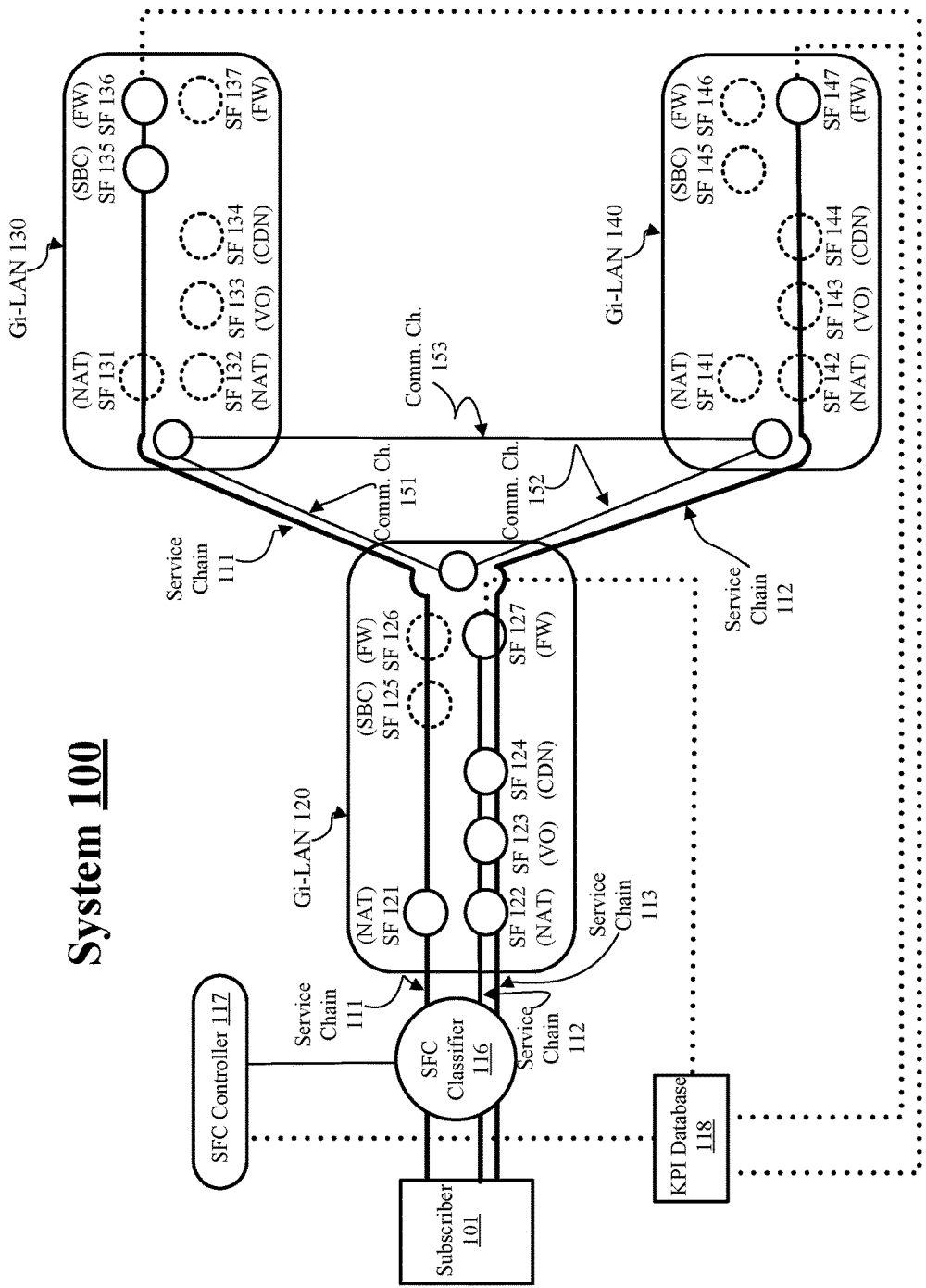
FIG. 1 illustrates an example system.

FIG. 1 illustrates an example system 100. In some examples, as shown in FIG. 1, system 100 includes a subscriber 101, a service function chain (SFC) classifier 116, an SFC controller 117, a key performance indicator (KPI) database 118 and Gi-LANs 120, 130 and 140. Subscriber 101, for example, may be a type of subscriber such as a mobile computing device that may subscribe to a telecommunication service. SFC classifier 116, SFC controller 117, KPI database 118, Gi-LAN 120, Gi-LAN 130 or Gi-LAN 140 may represent portions of network infrastructure on a packet data network (PDN) side arranged to support one or more SFCs associated with services provided to subscriber 101.

According to some examples, the one or more SFCs associated with services provided to subscriber 101 may include, but are not limited to, FW, vRouter, NAT, SBC, VO or CDN services. For these examples, as shown in FIG. 1, these services may be provided via service chains 111, 112 or 113. In order to provide the services, computing resources included in Gi-LAN 120, Gi-LAN 130 or Gi-LAN 140 such as, but not limited to, servers, processors, memory devices, storage devices, switches, routers, virtual machines, virtual switches, etc. may be arranged to provide service function (SFs). In support of providing these SFs, Gi-LANs 120, 130 and 140 may be communicatively coupled via communication channels (Comm. Ch.) 151, 152 or 153.

In some examples, various groupings of computing resources ("nodes") may be arranged to individually provide SFs. For example, as shown in FIG. 1, nodes at Gi-LAN 120 may be arranged to provide an NAT service (SF 121 or SF 122), a VO service (SF 123), a CDN service (SF 124), an SBC service (SF 125) or an FW service (SF 126 or SF 127). Nodes at Gi-LAN 130 may be arranged to provide an NAT service (SF 131 or SF 132), a VO service (SF 133), a CDN service (SF 134), an SBC service (SF 135) or an FW service (SF 136 or SF 137). Nodes at Gi-LAN 140 may be arranged to provide an NAT service (SF 141 or SF 142), a VO service (SF 143), a CDN service (SF 144), an SBC service (SF 145) or an FW service (SF 146 or SF 147).

According to some examples, the various services provided to subscriber 101 may be linked in an ordered list of services that may include at least a portion of the services mentioned above. The ordered list of services may be provided by a single Gi-LAN from among Gi-LANs 120, 130 or 140 or may be distributed among multiple Gi-LANs. For one example, as shown in FIG. 1, service chain 111 may include a single node at Gi-LAN 120 arranged to provide a NAT service (SF 121). Also, rather than include nodes to provide SBC and FW services (SF 125 and SF 126, respectively) at Gi-LAN 120, nodes at Gi-LAN 130 may be included in chain 111 to provide SBC and FW services (SF 135 and SF 136, respectively). For this example, the dashed-line circle nodes for SF 125, SF 126 or SF 131 may indicate that these nodes may be available for assignment to a service chain but have yet to be assigned or included. Alternatively, the dashed-line circles may indicate that the nodes are not available (e.g., beyond capacity or off-line) and these services may need to be routed or offloaded/migrated to another Gi-LAN such as Gi-LAN 130 (e.g., via communication channel 151). Also, service chain 111 passing through these dashed-line circle nodes may indicate packets merely passing through these nodes, e.g., forwarded towards other nodes providing SFs for service chain 111.

In another example, service chain 112 may include multiple nodes at a single Gi-LAN providing all the SFs. As shown in FIG. 1, service chain 112 includes the nodes at Gi-LAN 120 arranged to provide all SFs for this service chain. For example, a NAT service (SF 122), a VO service (SF 123), a CDN service (SF 124) and an FW service (SF 127) may be provided by nodes at Gi-LAN 120.

In another example, service chain 113 may include multiple nodes at Gi-LAN 120 and a single node at Gi-LAN 140 to provide SFs. As shown in FIG. 1, service chain 113 includes a NAT service (SF 122), a VO service (SF 123) and a CDN service (SF 124) provided by nodes at Gi-LAN 120. Then a single node at Gi-LAN 140 may provide an FW service (SF 147). For this example, although a FW service (SF 127) was included in service chain 113, for service chain 112 this node is not utilized as shown by service chain 112 passing through the node.

According to some examples, a network service header (NSH) protocol may be utilized to facilitate providing SFs included in an SFC. The NSH protocol may be arranged according to an Internet Engineering Task Force (IETF) draft standard related to SFC entitled "Network Service Header, draft-ietf-sfc-nsh-o6" published in August 2016 (hereinafter referred to as "the NSH draft standard"). The NSH protocol described in the NSH draft standard specifies a header which may be inserted onto packets between transport headers for various communication protocols and a packet payload. The header arranged according to the NSH protocol may enable network packets to traverse service function paths similar to the paths shown in FIG. 1 for service chains 111, 112 or 113. As described in more detail below, a user-defined metadata feature of a header arranged according to the NSH protocol may allow SFs in a service chain to insert/attach QoS configuration information ("QoS stamping information") into/onto a network packet at its ingress and/or egress point at respective nodes arranged to provide SFs in the service chain.

In some examples, as described more below, a final SF in a given service chain utilizing the user-defined metadata feature of a header arranged according to the NSH protocol may cause QoS stamping information collected along an SF path to be stored at KPI database 118. A platform performance monitor such as SFC controller 117 may access KPI database 118 to determine whether nodes providing SFs in the given service chain operate under consistent QoS requirements or configurations based on the QoS stamping information.

According to some examples, which flow or points along a service chain to monitor may be set by one or more policies established by SFC controller 117 or may be established based on guidelines set by service level agreements (SLAs). These policies may be provided to SFC classifier 116. SFC classifier 116 may insert/attach a header arranged according to the NSH protocol into/onto packets based, at least in part, on these policies. The inserted/attached header may include a user-defined metadata feature to facilitate implementation of the one or more policies.

In some examples, by using the NSH protocol in this manner, service providers may have an ability to check QoS configuration consistency at selected nodes providing SFs. QoS misconfiguration may be a common problem in some service provider IP networks, and may be difficult to debug as SF flows may traverse multiple equipment types with different operating systems (OSs), command line interfaces (CLIs) or network management systems (NMSs). As described more below, a scheme or process may be implemented to allow a network operator to quickly and accurately determine QoS configuration issues to possibly reduce operational costs or expenditures.

Although system 100 depicts SFC classifier 116 coupled with Gi-LAN 120, in other examples SFC classifier 116 may be located within other NFV infrastructure that may be physically closer to subscriber 101. For example, at a base station or evolved node B (eNodeB) for a 3GPP wireless network or possibly in a cloud radio access network (C-RAN) for future generations (e.g., 5G) of wireless networks.

According to some examples, SFC controller 117, SFC classifier 116, KPI database 118 or nodes included in Gi-LANs 120, 130 or 140 may be hosted by separate computing platforms or at least some of these elements of system 100 may be hosted on a same computing platform. A computing platform may include, but is not limited to, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof.

Figure 2:
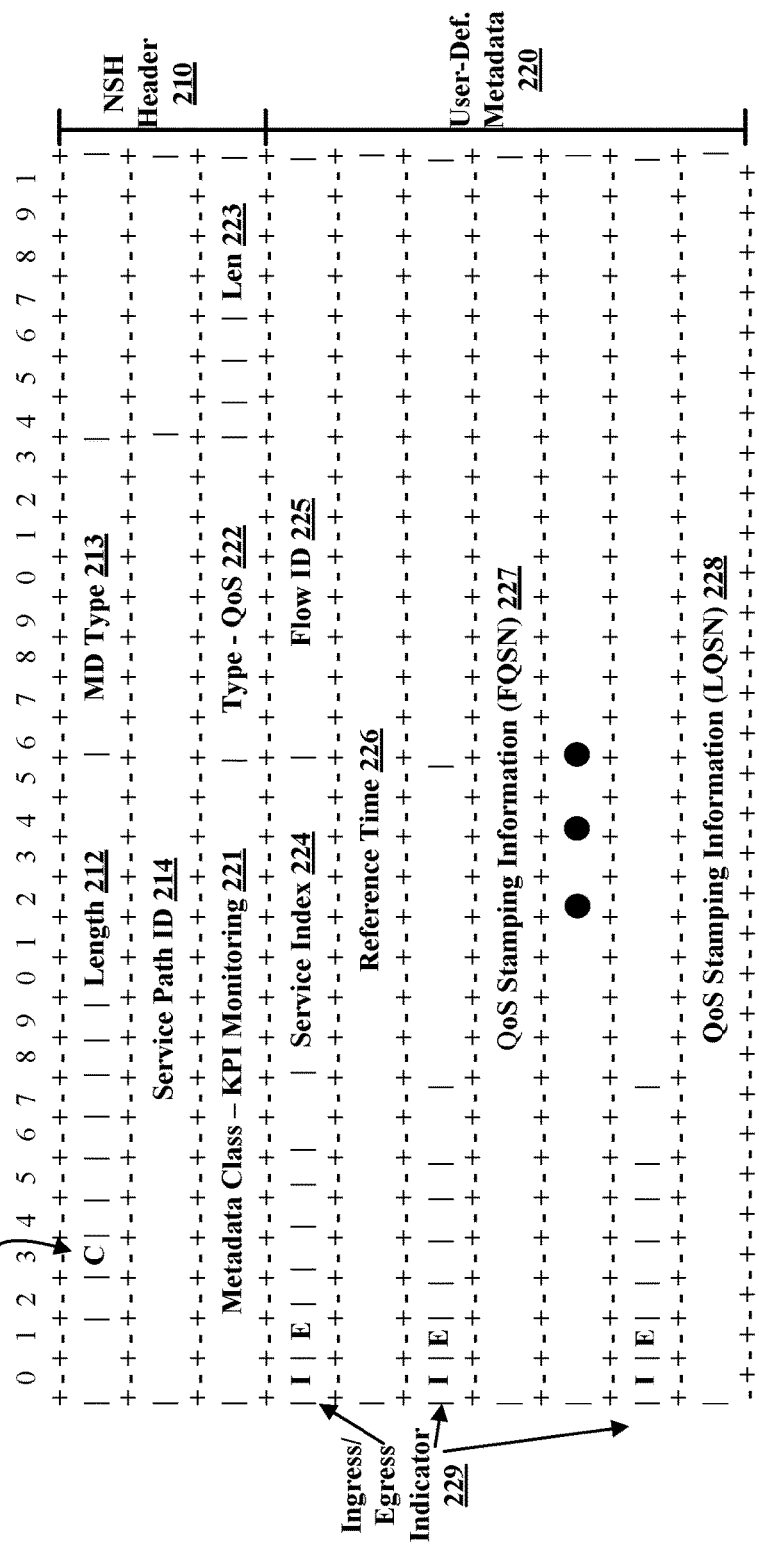
FIG. 2 illustrates an example format.

FIG. 2 illustrates an example format 200. In some examples, as shown in FIG. 2, format 200 may include an NSH header 210 portion and user-defined metadata 220 portion. For these examples, NSH header 210 may be arranged according to the NSH protocol described in the NSH draft standard. Also, user-defined metadata 220 may be arranged as metadata type 2 (MD-type 2) according to the NSH draft standard. For simplicity purposes, example format 200 shown in FIG. 2 does not label all fields that may be associated with an NSH header having MD-type 2 according to the NSH draft standard. Fields that are labeled and shown in FIG. 2 include fields 211 to 214 for NHS header 210 and fields 221 to 229 for user-defined metadata 220. These labeled fields may be applicable to allowing nodes providing SFs in a service chain to insert/attach QoS stamping information into/onto a network packet at its ingress and/or egress point at a node arranged to provide the SF as described in more detail below.

According to some examples, critical bit 211 may indicate that critical metadata type-length-value (TLV) is present with NSH header 210. Length 212 may indicate a length (e.g., in bytes) of both NSH header 210 and user-defined metadata 220. MD type 213 may be set to a value of 2 to indicate that user-defined metadata is included with NSH header 210. Service path identifier (ID) 214 may identify a path for which the network packet having NSH header 210 and user-defined metadata 220 is to follow when a network packet is routed through nodes arranged to provide SFs as part of a service chain.

In some examples, as shown in FIG. 2, user-defined metadata 220 may include metadata class—KPI monitoring 221. For these examples, Metadata Class—KPI Monitoring 221 may include information to indicate that a type of key performance information may be gathered in the user-defined metadata included with a header using the NSH protocol and example format 200. User-defined metadata 220 may also include Type—QoS 222 to indicate that the type of key performance information includes QoS configuration data. User-defined metadata 220 may also include Len 223 to indicate a length or size of user-defined metadata included with the header using the NSH protocol and example format 200.

According to some examples, user-defined metadata 220 may also include Service Index 224. For these examples, Service Index 224 may serve as a counter to indicate how many SFs in a service chain are to insert QoS stamping information. For example, after a node providing an SF inserts its QoS stamping information, a value included in Service Index 224 may be decremented. The first node inserting its QoS stamping may be a first QoS stamping node (FQSN) and a node having a value of "0" in Service Index 224 may be the last QoS stamping node (LQSN).

In some examples, user-defined metadata 220 may also include flow ID 225. For these examples, flow ID 225 may be an identifier for a flow associated with the QoS configuration data gathered. User-defined metadata 220 may also include Reference Time 226. According to some examples, Reference Time 226 may be inserted by an SFC classifier that generated the header using the NSH protocol and example format 200. Reference Time 226 may include, for example, a coordinated universal time (UTC) start time that may serve as a reference point for QoS monitoring in a service chain. The reference point may be used to facilitate debugging of QoS configuration inconsistencies when detected.

According to some examples, user-defined metadata 220 may also include QoS Stamping Information (FQSN) 227. For these examples, QoS Stamping Information (FQSN) 227 may include QoS stamping information inserted by the FQSN providing an SF included in the service chain. The QoS stamping information, for example, may include a traffic class or priority indicated in one or more QoS fields for a network packet associated with the header using the NSH protocol and example format 200. QoS Stamping Information (LQSN) 228 may include QoS stamping information inserted by the LQSN providing an SF included in the service chain that may also include a traffic class or priority indicated in the one or more QoS fields for the network packet. As implied by " . . . " between QoS Stamping Information (FQSN) 227 and QoS Stamping Information (LQSN) 228, any number of fields to include QoS stamping information may be inserted by other nodes providing other SFs in the service chain. After each node has inserted its QoS stamping information, each node may update Length 212 in NSH header 210 and Len 223 in user-defined metadata to reflect respective changes in length of an NSH-encapsulated network packet. User-defined metadata 220, as shown in FIG. 2 also include ingress/egress indicator 229 to indicate whether the QoS stamping information was obtained at ingress or egress as the NSH-encapsulated network packet enters or exists the node providing the SF. In some examples, QoS stamping information may be inserted for either one of ingress or egress or for both ingress and egress.

In some examples, the length or size of QoS stamping information inserted by all nodes providing SFs in the service chain may be set based on a policy to limit the length or size of QoS stamping information to avoid fragmentation of the user-defined metadata. For example, the total size of the header using the NSH protocol and example format 200 after the LQSN has added QoS stamping information may be limited to 255 bytes to avoid fragmentation in at least some types of networks. Examples are not limited to a total size or length of 255 bytes.

Figure 3:
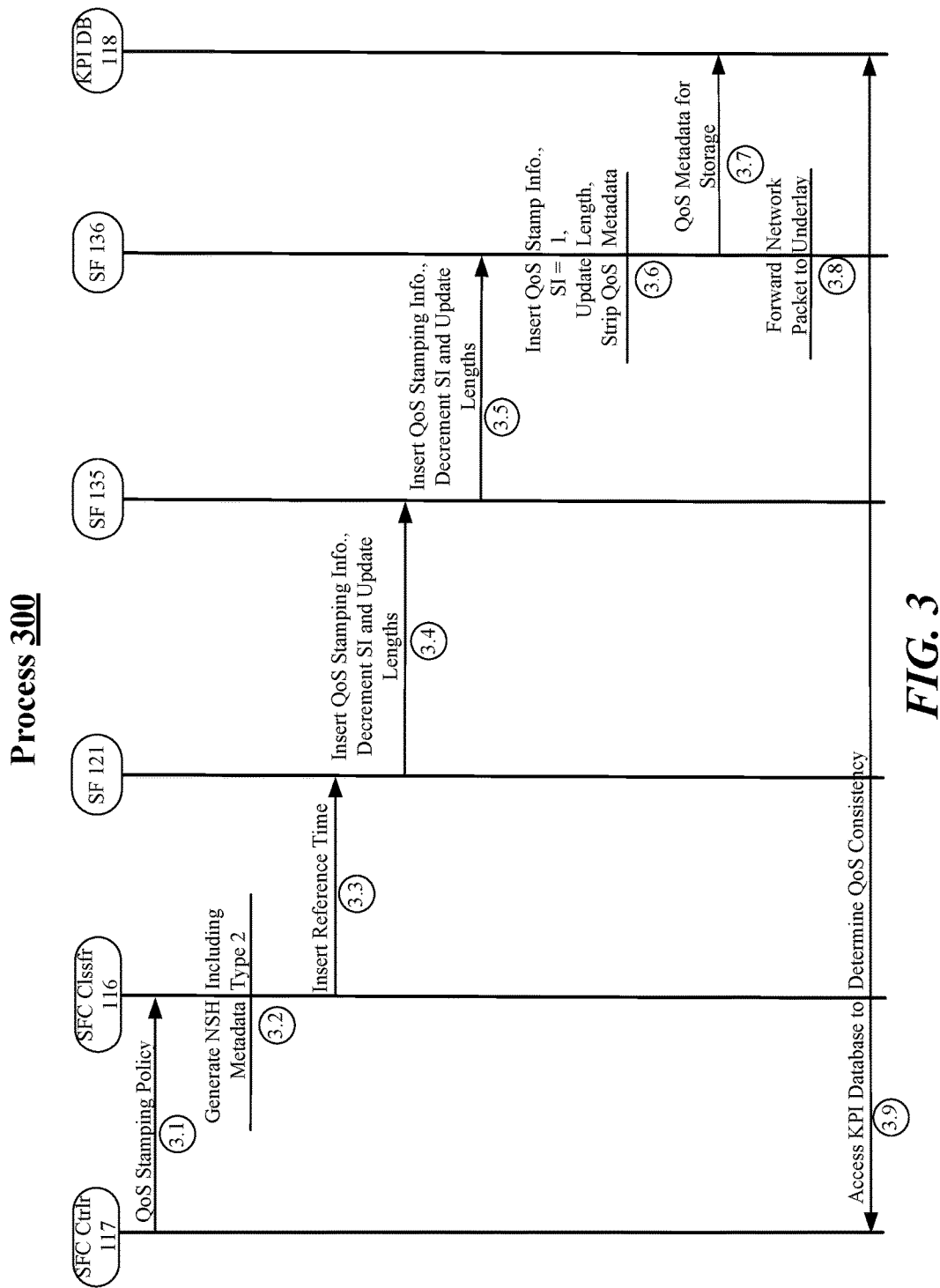
FIG. 3 illustrates an example process.

FIG. 3 illustrates an example process 300. In some examples, process 300 may be for use of a header using the NSH protocol and having user-defined metadata to monitor key performance information such as QoS configuration consistency in a service chain. For these examples, elements of system 100 associated with SC 111 as shown in FIG. 1 may be related to process 300. These elements of system 100 may include SFC controller 117, SFC classifier 116, nodes of Gi-LAN 120 and nodes of Gi-LAN 130 and KPI database 118. Further, example format 200 as shown in FIG. 2 may also be related to process 300. However, example process 300 is not limited to implementations using elements/sub-elements of system 100 associated with SC 111 or example format 200 shown in FIGS. 1-2.

Beginning at process 3.1 (QoS Stamping Policy), logic and/or features at SFC controller 117 may implement a policy for monitoring one or more QoS fields of a network packet routed through nodes arranged to separately provide individual SFs included in a SFC. The policy, for example, may indicate which service chain to monitor and may also indicate which service flow within the service chain may be monitored. For example, service chain 111 may be indicated and a flow that goes through nodes providing SFs 121, 135 and 136 may be indicated in the policy. The policy may also indicate which QoS fields of a network packet encapsulated with the NSH are to be monitored. For example, QCI bits, outer IEEE 802.1p bits, DSCP bits or TEID bits may be the QoS fields to monitor. The policy may also indicate how the QoS stamping information is to be inserted at each node providing a SF in the service chain, e.g., inserted at ingress, egress or both. The policy may also indicate a maximum message size that may limit how much QoS information is to be included in QoS stamping information inserted by nodes. As mentioned previously, length or size limitations may prevent fragmentation of QoS stamping information. Fragmentation may be problematic to monitoring QoS consistency as fragmented QoS stamping information may be routed differently through a network. Examples are not limited to the above-mentioned policies, other policies are contemplated.

Moving to process 3.2 (Generate NSH Including Metadata Type 2), logic and/or features at SFC classifier 116 may generate an NSH including metadata type 2 based on the policy information received from SFC controller 117. In some examples, the NSH may be a header using the NSH protocol and example format 200 shown in FIG. 2. For these examples, SFC classifier 116 may set critical bit 202 to indicate that critical metadata is present in user-defined metadata 220. SFC classifier 116 may also set MD Type 206 to indicate type 2 metadata. SFC classifier 116 may also include QoS stamping information options such as ingress/egress/both in Type—QoS 212 to indicate to QoS stamping nodes when to collect and insert QoS stamping information. SFC classifier 116 may also include a value for Service Index 216 that may be decremented by each node providing SFs in service chain 111 and used by the nodes to determine when the last QoS stamping node (LQSN) is reached in service chain 111.

Moving to process 3.3 (Insert Reference Time), logic and/or features at SFC classifier 116 may insert a reference time. The reference time may be inserted in reference time 226 and may include an UTC start time as a reference point for QoS monitoring in service chain 111. SFC classifier may then encapsulate a network packet with the generated NSH and send the NSH-encapsulated network packet to the node providing SF 121 for service chain 111.

Moving to process 3.4 (Insert QoS Stamp Info., Decrement SI, Update Lengths), logic and/or features at the node providing SF 121 may receive the NSH-encapsulated network packet from SFC classifier 116. The node providing SF 121, as shown in FIG. 1 for system 100 may be the first QoS stamping node (FQSN) in service chain 111. The node providing SF 121 may insert QoS stamping information at ingress, egress or both, decrement the value included in Service Index 224 and then update lengths included in Length 212 and Len 223. The node may then forward the NSH-encapsulated network packet to the node providing SF 135 in service chain 111.

Moving to process 3.5 (Insert QoS Stamp Info., Decrement SI, Update Lengths), logic and/or features at the node providing SF 135 may insert QoS stamp information at ingress, egress or both, decrement the value included in Service Index 224 and then update lengths included in Length 212 and Len 223. The node may then forward the NSH-encapsulated network packet to the node providing SF 136 in service chain 111.

Moving to process 3.6 (Insert QoS Stamp Info., SI=1, Update Length, Strip QoS Metadata), logic and/or features at the node providing SF 136 may insert QoS stamping information at ingress, egress or both. The logic and/or features at the node may determine that the value in Service Index 224 had been decremented to a value of "1". The value of "1" may indicate this is the last QoS stamping node (LQSN) in service chain 111. The node may update the length of all the inserted QoS stamping information included in user-defined metadata 220 in Len 223. As the LQSN the node providing SF 136 may then strip the QoS metadata from the network packet.

Moving to process 3.7 (QoS Metadata for Storage) logic and/or features at the node providing SF 136 may send the stripped QoS metadata for storage at KPI DB 118. In some examples, the stripped QoS metadata may include information maintained in the fields included user-defined metadata 220 portion of the header using the NSH protocol and example format 200.

Moving to process 3.8 (Forward Network Packet to Underlay), logic and/or features at the node providing SF 136 may forward the network packet (without NSH) to the underlay or towards its destination. In some examples, the underlay may include additional NFV infrastructure outside of service chain 111.

Moving to process 3.9 (Access KPI Database to Determine QoS Consistency), logic and/or features at SFC controller 117 may access the KPI database to determine QoS configuration consistency. In some examples, SFC controller 117 may identify possible QoS configuration inconsistencies and then cause debugging actions to be implemented to correct the QoS configuration inconsistencies. The process may then come to an end.

According to some examples, SFC controller 117 may need to consider that some physical-functions may exist in a service chain that may not insert QoS stamp information. This may impact the policies submitted to SFC classifier 116. Also, some nodes providing SFs in a given service chain or NFV infrastructure supporting the service chain may not be NSH aware. In other words, these nodes and/or NFV infrastructure may lack an awareness or ability to decode or encode NSH-encapsulated network packets according to the NSH protocol. Policies provided by SFC controller 117 may also have to accommodate these types of non NSH awareness.

Figure 4:
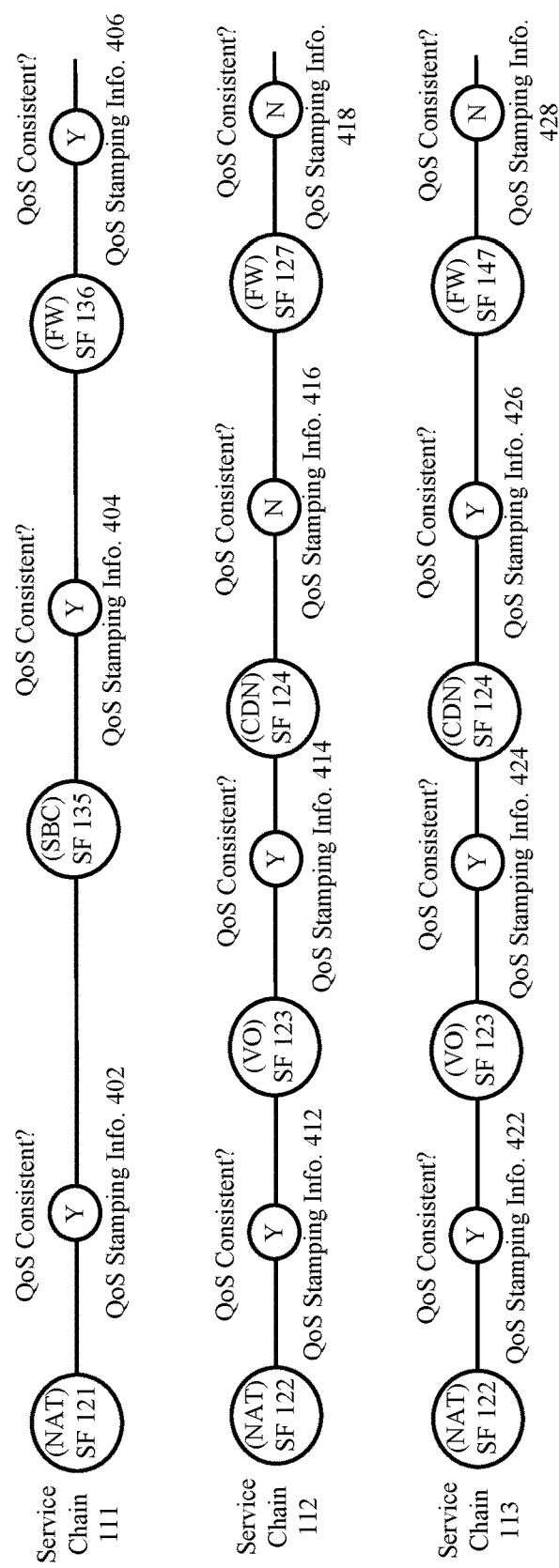
FIG. 4 illustrates an example scheme.

FIG. 4 illustrates an example scheme 400. In some examples, scheme 400 may depict an analysis scheme to review QoS stamping information inserted in service chains 111, 112 and 113. For these examples, the QoS stamping information for service chains 112 and 113 may have been gathered and stored to KPI DB 118 in a similar manner as described above for process 300. Logic and/or features of SFC controller 117 may be capable of analyzing QoS stamping information to determine whether the QoS stamping indicates QoS configuration inconsistencies. For example, QoS stamping information 402, 404 and 406 gathered for service chain 111 were determined as having consistent QoS configurations (e.g., all indicated a same traffic class). However, QoS stamping information 416 and 418 for service chain 112 and QoS stamping information 428 for service chain 113 were determined as not having consistent QoS configurations. Logic and/or features at SFC controller 117 may then initiate debugging actions to correct the determined inconsistent QoS configurations at the nodes showing inconsistent QoS configurations. For example, cause updates to the node providing SF 124 to modify the QoS configurations indicated in QoS stamping information 416, cause updates to the node providing SF 127 to modify the QoS configuration indicated in QoS stamping information 418 and cause updates to the node providing SF 147 to modify QoS configurations indicated in QoS stamping information 428. These modifications may remove the inconsistencies observed for respective service chain 112 and service chain 113. SFC controller 117 may also use the reference time inserted by SFC classifier 116 to facilitate debugging efforts.

Figure 5:
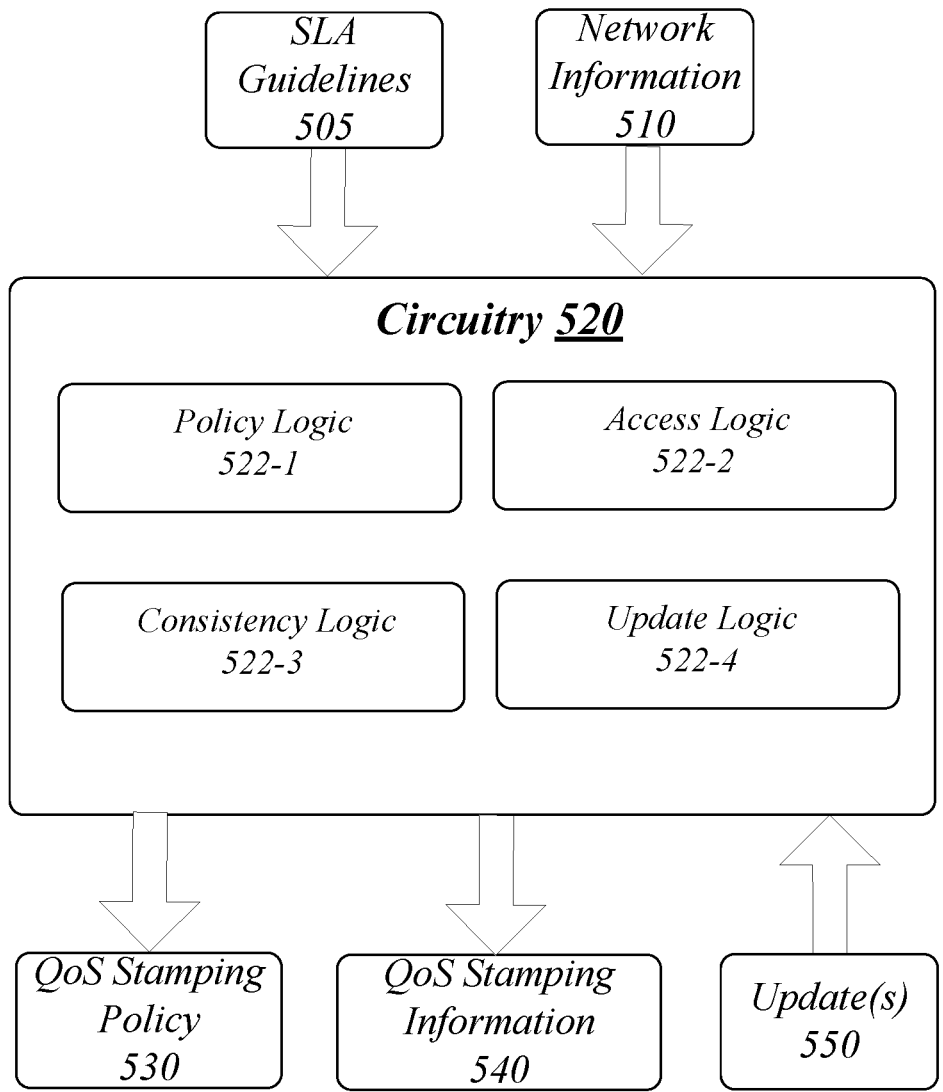
FIG. 5 illustrates an example block diagram for a first apparatus.

FIG. 5 illustrates an example block diagram for apparatus 500. Although apparatus 500 shown in FIG. 5 has a limited number of elements in a certain topology, it may be appreciated that the apparatus 500 may include more or less elements in alternate topologies as desired for a given implementation.

According to some examples, apparatus 500 may be supported by circuitry 520 maintained at a controller that monitors one or more QoS fields of a network packet routed through nodes arranged to separately provide individual SFs included in an SFC. The controller may be similar to SFC controller 117 shown in FIG. 1. Circuitry 520 may be arranged to execute one or more software or firmware implemented modules, components or logic 522-$a$ (module, component or logic may be used interchangeably in this context). It is worthy to note that "a" and "b" and "c" and similar designators as used herein are intended to be variables representing any positive integer. Thus, for example, if an implementation sets a value for a=4, then a complete set of software or firmware for components 522-$a$ may include logic 522-1, 522-2, 522-3 or 522-4. The examples presented are not limited in this context and the different variables used throughout may represent the same or different integer values. Also, "logic" may also include software/firmware stored in computer-readable media, and although logic is shown in FIG. 5 as discrete boxes, this does not limit this logic to storage in distinct computer-readable media components (e.g., a separate memory, etc.).

According to some examples, circuitry 520 may include a processor, processor circuit or processor circuitry. Circuitry 520 may be generally arranged to execute one or more software components 522-a. Circuitry 520 may be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Atom®, Celeron®, Core (2) Duo®, Core i3, Core i5, Core i7, Itanium®, Pentium®, Xeon®, Xeon Phi® and XScale® processors; and similar processors. According to some examples circuitry 520 may also include an application specific integrated circuit (ASIC) and at least some components 522-a may be implemented as hardware elements of the ASIC. According to some examples, circuitry 520 may also include a field programmable gate array (FPGA) and at least some logic 522-a may be implemented as hardware elements of the FPGA.

According to some examples, apparatus 500 may include a policy logic 522-1. Policy indication logic 522-1 may be executed by circuitry 520 to provide a QoS stamping policy to an SFC classifier to cause the SFC classifier to generate an NSH that includes metadata type 2. The metadata type 2 may include QoS stamping information inserted by nodes arranged to separately provide individual SFs included in the SFC. For these examples, policy logic 522-1 may provide the QoS stamping policy via QoS stamping policy 530. The provided QoS stamping policy may be based on SLA guidelines 505 and/or network information 510. SLA guidelines 505 may indicate QoS traffic classes that may need to be consistent as the network packet is routed through the nodes. Also, network information 510 may provide policy logic 522-1 with information on how the QoS traffic classes may need to be formatted in the one or more QoS fields of the network packet in order to be consistent.

In some examples, apparatus 500 may also include an access logic 522-2. Access logic 522-2 may be executed by circuitry 520 to access a database arranged to store QoS stamping information inserted by the nodes separately arranged to provide individual SFs in the SFC. The QoS stamping information may be gathered according to the QoS stamping policy as the network packet is routed through the nodes. For these examples, QoS stamping information 540 may include the accessed QoS stamping information gathered by the nodes.

In some examples, apparatus 500 may also include a consistency logic 522-3. Consistency logic 522-3 may be executed by circuitry 520 to determine whether the QoS stamping information indicates a consistent QoS configuration in the one or more QoS fields of the network packet at node ingress or node egress of the network packet as routed through the nodes. For these examples, network information 510 may provide consistency logic 522-1 with information on how the QoS traffic classes may need to be formatted in the one or more QoS fields of the network packet in order to be determined as consistent. For example, consistent QoS traffic class levels.

In some examples, apparatus 500 may also include an update logic 522-4. Update logic 522-4 may be executed by circuitry 520 to cause an update to the identified node or nodes to correct the inconsistent QoS configuration in the one or more QoS fields of the network packet. For these examples, update(s) 550 may include information for the nodes to correct their respective one or more QoS fields in order to become consistent.

Various components of apparatus 500 and a device or node implementing apparatus 500 may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

FIG. 6 illustrates an example logic flow 600. Logic flow 600 may be representative of some or all of the operations executed by one or more logic, features, or devices described herein, such as apparatus 600. More particularly, logic flow 600 may be implemented by at least policy logic 522-1, access logic 522-2, consistency logic 522-3 or update logic 522-4.

According to some examples, logic flow 600 at block 602 may provide a QoS stamping policy to an SFC classifier to cause the SFC classifier to generate an NSH that includes metadata type 2, the metadata type 2 to include QoS stamping information inserted by nodes arranged to separately provide individual SFs included in the SFC. For these examples, policy logic 522-1 may provide the QoS stamping policy to the SFC classifier.

In some examples, logic flow 600 at block 604 may access a database arranged to store QoS stamping information inserted by the nodes separately arranged to provide individual SFs in the SFC, the QoS stamping information to be gathered according to the QoS stamping policy as the network packet is routed through the nodes. For these examples, access logic 522-2 may access the database.

According to some examples, logic flow 600 at block 606 may determine whether the QoS stamping information indicates a consistent QoS configuration in the one or more QoS fields of the network packet at node ingress or node egress of the network packet as routed through the nodes. For these examples, consistency logic 522-3 may determine whether the QoS stamping information indicates consistency.

FIG. 7 illustrates an example storage medium 700. As shown in FIG. 7, the first storage medium includes a storage medium 700. The storage medium 700 may comprise an article of manufacture. In some examples, storage medium 700 may include any non-transitory computer readable medium or machine readable medium, such as an optical, magnetic or semiconductor storage. Storage medium 700 may store various types of computer executable instructions, such as instructions to implement logic flow 600. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 8:
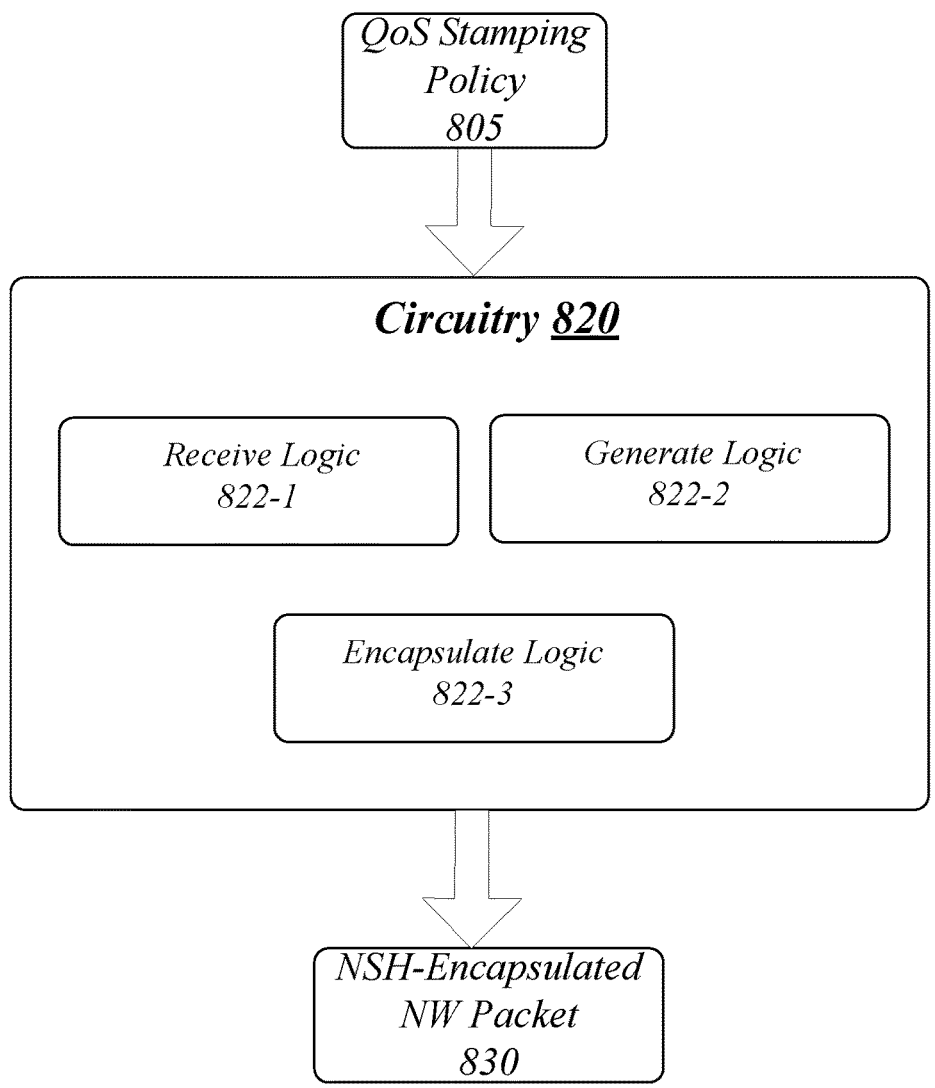
FIG. 8 illustrates an example block diagram for a second apparatus.

FIG. 8 illustrates an example block diagram for apparatus 800. Although apparatus 800 shown in FIG. 8 has a limited number of elements in a certain topology, it may be appreciated that the apparatus 800 may include more or less elements in alternate topologies as desired for a given implementation.

According to some examples, apparatus 800 may be supported by circuitry 820 at a an SFC classifier. The SFC classifier may be similar to SFC classifier 116 shown in FIG. 1. Circuitry 820 may be arranged to execute one or more software or firmware implemented modules, components or logic 822-a (module, component or logic may be used interchangeably in this context). It is worthy to note that "a" and "b" and "c" and similar designators as used herein are intended to be variables representing any positive integer. Thus, for example, if an implementation sets a value for a=3, then a complete set of software components 822-a may include components 822-1, 822-2 or 822-3. The examples are not limited in this context and the different variables used throughout may represent the same or different integer values. Also, "logic" may also include software/firmware stored in computer-readable media, and although logic is shown in FIG. 8 as discrete boxes, this does not limit this logic to storage in distinct computer-readable media components (e.g., a separate memory, etc.).

According to some examples, circuitry 820 may include a processor, processor circuit or processor circuitry. Circuitry 820 may be generally arranged to execute one or more software components 822-a. Circuitry 820 can be any of various commercially available processors to include but not limited to the processors mentioned above for apparatus 500. Also, according to some examples, circuitry 820 may also be an ASIC and at least some components 822-a may be implemented as hardware elements of the ASIC.

According to some examples, apparatus 800 may include a receive logic 822-1. Receive logic 822-1 may be executed by circuitry 820 to receive a QoS stamping policy for monitoring one or more QoS fields of a network packet routed through nodes separately arranged to provide individual SFs in an SFC. The QoS stamping policy may be received from an SFC controller such as SFC controller 117 shown in FIG. 1 and may be included in QoS stamping policy 805.

In some examples, apparatus 800 may include a generation logic 822-2. Generation logic 822-2 may be executed by circuitry 820 to generate a network service header (NSH) that includes metadata type 2 based on the QoS stamping policy. The metadata type 2 may include QoS stamping information inserted by nodes arranged to separately provide individual SFs included in the SFC. The metadata type 2 may be similar to the user-defined metadata 200 shown in FIG. 2 for format 200 and may include a service index, the service index arranged to be used by the nodes separately arranged to provide individual SFs to determine which node is a last QoS stamping node in the SFC. The metadata type 2 may also include a reference time in the metadata type 2, the reference time to indicate a beginning time for monitoring the one or more QoS fields of the network packet.

According to some examples, apparatus 800 may also include encapsulate logic 822-3. Encapsulation logic 822-3 may be executed by circuitry 820 to encapsulate the network packet with the generated NSH and cause the NSH-encapsulated network packet to be sent to a first node of the nodes arranged to separately provide individual SFs in the SFC. For these examples, the NSH-encapsulated network packet may be included in NSH-encapsulated NW packet 830.

Various components of apparatus 800 and a device implementing apparatus 800 may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

FIG. 9 illustrates an example logic flow 900. Logic flow 900 may be representative of some or all of the operations executed by one or more logic, features, or devices described herein, such as apparatus 900. More particularly, logic flow 900 may be implemented by at least receive logic 822-1, generate logic 822-2 or encapsulate logic 822-3.

According to some examples, logic flow 900 at block 902 may receive a QoS stamping policy for monitoring for one or more QoS fields of a network packet routed through nodes separately providing individual SFs in an SFC. For these examples, the QoS stamping policy may be received by receive logic 822-1.

In some examples, logic flow 900 at block 904 may generate a network service header (NSH) that includes metadata type 2 based on the QoS stamping policy, the metadata type 2 to include QoS stamping information inserted by nodes arranged to separately provide individual SFs included in the SFC. For these examples, generate logic 822-2 may generate the NSH that includes the metadata type 2.

According to some examples, logic flow 900 at block 906 may encapsulate the network packet with the generated NSH. For these examples, encapsulate logic 822-3 may encapsulate the network packet with the generated NSH.

In some examples, logic flow 900 at block 908 may send the NSH-encapsulated network packet to a first node of the nodes separately providing individual SFs in the SFC. For these examples, encapsulate logic 822-3 may cause the NSH-encapsulated network packet to be sent to the first node.

FIG. 10 illustrates an example storage medium 1000. As shown in FIG. 10, the first storage medium includes a storage medium 1000. The storage medium 1000 may comprise an article of manufacture. In some examples, storage medium 1000 may include any non-transitory computer readable medium or machine readable medium, such as an optical, magnetic or semiconductor storage. Storage medium 1000 may store various types of computer executable instructions, such as instructions to implement logic flow 900. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 11:
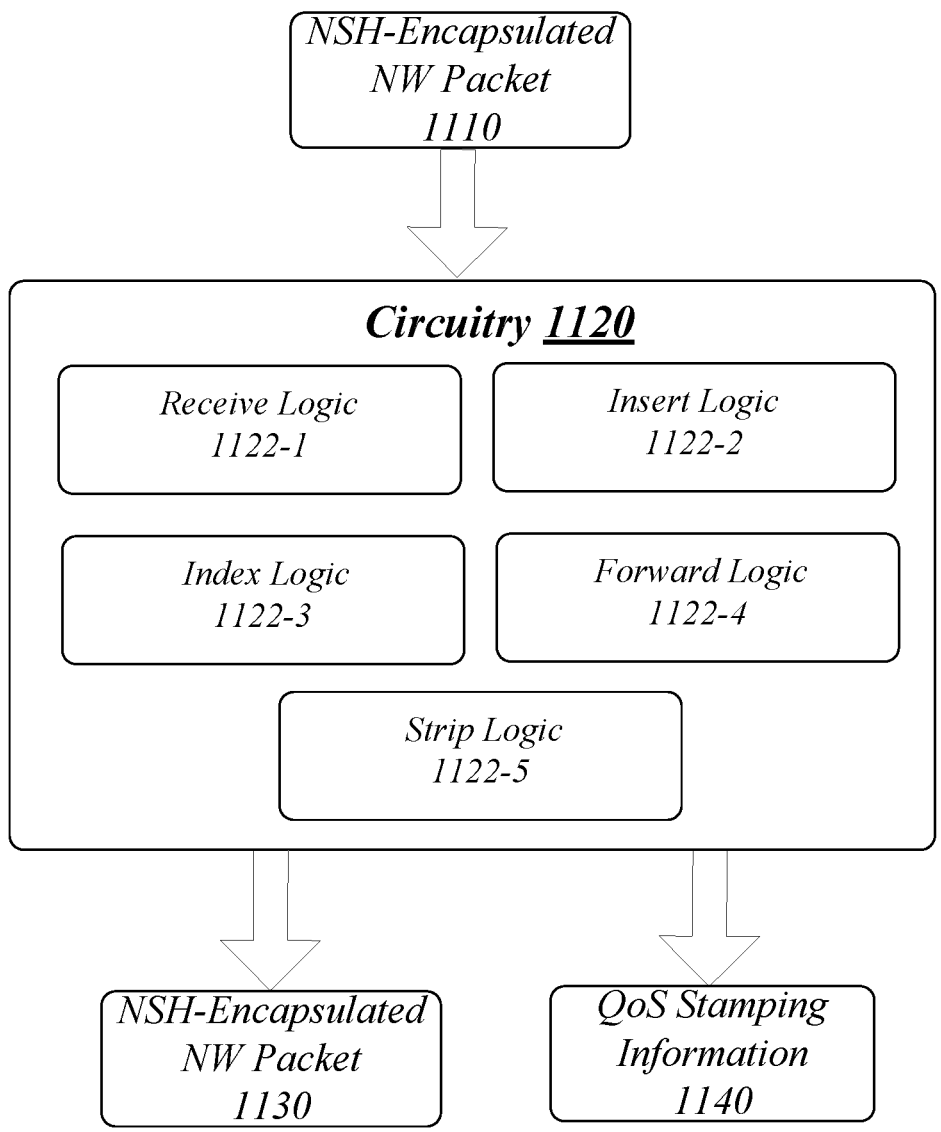
FIG. 11 illustrates an example block diagram for a third apparatus.

FIG. 11 illustrates an example block diagram for apparatus 1100. Although apparatus 1100 shown in FIG. 11 has a limited number of elements in a certain topology, it may be appreciated that the apparatus 1100 may include more or less elements in alternate topologies as desired for a given implementation.

According to some examples, apparatus 1100 may be supported by circuitry 1120 at a node providing an SF included in an SFC. The SFC classifier may be similar to SFC classifier 116 shown in FIG. 1. Circuitry 1120 may be arranged to execute one or more software or firmware implemented modules, components or logic 1122-a (module, component or logic may be used interchangeably in this context). It is worthy to note that "a" and "b" and "c" and similar designators as used herein are intended to be variables representing any positive integer. Thus, for example, if an implementation sets a value for a=5, then a complete set of software components 1122-a may include components 1122-1, 1122-2, 1122-3, 1122-4 or 1122-5. The examples are not limited in this context and the different variables used throughout may represent the same or different integer values. Also, "logic" may also include software/firmware stored in computer-readable media, and although logic is shown in FIG. 11 as discrete boxes, this does not limit this logic to storage in distinct computer-readable media components (e.g., a separate memory, etc.).

According to some examples, circuitry 1120 may include a processor, processor circuit or processor circuitry. Circuitry 1120 may be generally arranged to execute one or more software components 1122-a. Circuitry 1120 can be any of various commercially available processors to include but not limited to the processors mentioned above for apparatus 500. Also, according to some examples, circuitry 1120 may also be an ASIC and at least some components 1122-a may be implemented as hardware elements of the ASIC.

According to some examples, apparatus 1100 may include a receive logic 1122-1. Receive logic 1122-1 may be executed by circuitry 1120 to receive a network packet encapsulated with an NSH that includes metadata type 2. For these examples, the network packet encapsulated with the NSH that includes metadata type 2 may be included in NSH-encapsulated NW packet 1110.

In some examples, apparatus 1100 may include an insert logic 1122-2. Insert logic 1122-2 may be executed by circuitry 1120 to insert QoS stamping information that indicates QoS configuration information for a QoS field of the network packet at ingress or egress of the NHS-encapsulated network packet.

According to some examples, apparatus 1100 may also include index logic 1122-3. Index logic 1122-3 may be executed by circuitry 1120 to determine whether the node is the last node in the SFC. For these examples, determination may be based on a service index value indicated in the metadata type 2.

In some examples, apparatus 1100 may include a forward logic 1122-4. Forward logic 1122-4 may be executed by circuitry 1120 to forward the NHS-encapsulated network packet with the inserted QoS stamp information to a next node arranged to provide a different SF included in the SFC if the node is determined to not be the last node in the SFC. For these examples, the node is determined to not be the last node if the service index value is greater than a value of "1".

According to some examples, apparatus 1100 may also include strip logic 1122-5. Strip logic 1122-5 may be executed by circuitry 1120 to strip information included in the metadata type 2 from the NSH-encapsulated network packet and cause the information to be sent for storage at a database accessible to an SFC controller. The SFC controller may be arranged to monitor one or more QoS fields on the network packet for QoS configuration consistency as the network packet was routed through nodes arranged to provide SFs included in the SFC based on the information sent for storage at the database. For these examples, the stripped information may be included in QoS stamping information 1140.

Various components of apparatus 1100 and a device implementing apparatus 1100 may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

FIG. 12 illustrates an example logic flow 1200. Logic flow 1200 may be representative of some or all of the operations executed by one or more logic, features, or devices described herein, such as apparatus 1200. More particularly, logic flow 1200 may be implemented by at least receive logic 1122-1, insert logic 1122-2, index logic 1122-3, forward logic 1122-4 or strip logic 1122-5.

According to some examples, logic flow 1200 at block 1202 may receive, at a processor circuit of a node providing an SF included in an SFC, a network packet encapsulated with an NSH that includes metadata type 2. For these examples, receive logic 1122-1 may receive the NSH-encapsulated network packet.

In some examples, logic flow 1200 at block 1204 may insert QoS stamping information that indicates QoS configuration information for a QoS field of the network packet at ingress or egress of the NETS-encapsulated network packet. For these examples, insert logic 1122-2 may insert the QoS configuration information.

According to some examples, logic flow 1200 at block 1206 may determine whether the node is the last node in the SFC and forward the NETS-encapsulated network packet with the inserted QoS configuration information to a next node arranged to provide a different SF included in the SFC if the node is determined to not be the last node in the SFC. For these examples, forward logic 1122-4 may forward the NETS-encapsulated network packet based on index logic 1122-3 determining that the node is not the last node in the SFC.

FIG. 13 illustrates an example storage medium 1300. As shown in FIG. 13, the first storage medium includes a storage medium 1300. The storage medium 1300 may comprise an article of manufacture. In some examples, storage medium 1300 may include any non-transitory computer readable medium or machine readable medium, such as an optical, magnetic or semiconductor storage. Storage medium 1300 may store various types of computer executable instructions, such as instructions to implement logic flow 1200. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 14:
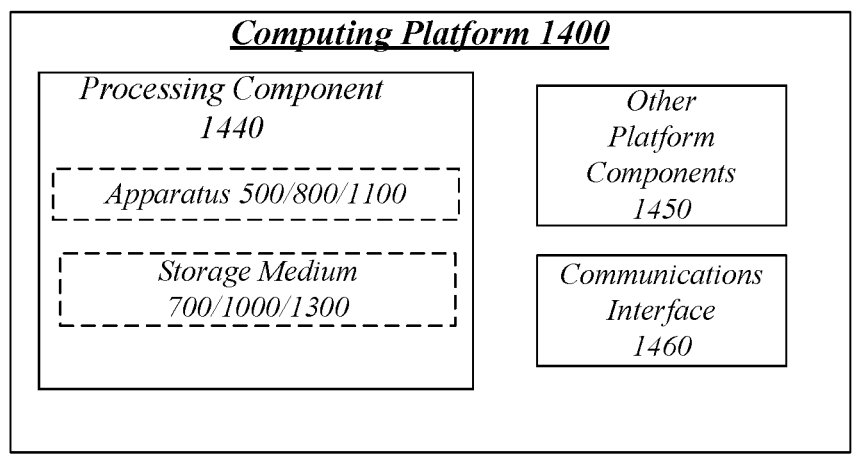
FIG. 14 illustrates an example computing platform.

FIG. 14 illustrates an example computing platform 1400. In some examples, as shown in FIG. 14, computing platform 1400 may include a processing component 1440, other platform components 1450 or a communications interface 1460.

According to some examples, processing component 1440 may execute processing operations or logic for apparatus 500/800/1100 and/or storage medium 700/1000/1300. Processing component 1440 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 1450 may include common computing elements, memory units, chipsets, controllers, peripherals, interfaces, oscillators, timing devices, video cards, audio cards, multimedia input/output (I/O) components (e.g., digital displays), power supplies, and so forth. Examples of memory units or memory devices may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 1460 may include logic and/or features to support a communication interface. For these examples, communications interface 1460 may include one or more communication interfaces that operate according to various communication protocols or standards to communicate over direct or network communication links. Direct communications may occur via use of communication protocols or standards described in one or more industry standards (including progenies and variants) such as those associated with the PCIe specification. Network communications may occur via use of communication protocols or standards such those described in one or more Ethernet standards promulgated by IEEE such as IEEE 802.3. Network communication may also occur according to one or more OpenFlow specifications such as the OpenFlow Hardware Abstraction API Specification. Network communications may also occur according to Infiniband Architecture specification.

As mentioned above computing platform 1400 may be implemented in a server or client computing device. Accordingly, functions and/or specific configurations of computing platform 1400 described herein, may be included or omitted in various embodiments of computing platform 1400, as suitably desired for a server or client computing device.

The components and features of computing platform 1400 may be implemented using any combination of discrete circuitry, application specific integrated circuits (ASICs), logic gates and/or single chip architectures. Further, the features of computing platform 1400 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 1400 shown in the block diagram of FIG. 14 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled" or "coupled with", however, may also mean that two or more elements are not in direct contact with each other, but yet still co-operate or interact with each other.

The follow examples pertain to additional examples of technologies disclosed herein.

Example 1

An example apparatus may include circuitry at a controller that monitors one or more QoS fields of a network packet routed through nodes arranged to separately provide individual SFs included in an SFC. The apparatus may also include policy logic for execution by the circuitry to provide a QoS stamping policy to an SFC classifier that may cause the SFC classifier to generate an NSH that includes metadata type 2. The metadata type 2 may include QoS stamping information inserted by nodes arranged to separately provide individual SFs included in the SFC. The apparatus may also include access logic for execution by the circuitry to access a database that may be arranged to store QoS stamping information inserted by the nodes separately arranged to provide individual SFs in the SFC. The QoS stamping information may be gathered according to the QoS stamping policy as the network packet is routed through the node. The apparatus may also include consistency logic for execution by the circuitry that may determine whether the QoS stamping information indicates a consistent QoS configuration in the one or more QoS fields of the network packet at node ingress or node egress of the network packet as routed through the nodes.

Example 2

The apparatus of example 1 may also include the consistency logic to determine that the QoS stamping information indicates an inconsistent QoS configuration in the one or more QoS fields of the network packet and identify which node or nodes have the inconsistent QoS configuration. The apparatus may also include update logic for execution by the circuitry that may cause an update to the identified node or nodes to correct the inconsistent QoS configuration in the one or more QoS fields of the network packet.

Example 3

The apparatus of example 2, the inconsistent QoS configuration in the one or more QoS fields of the network packet may be different traffic classes indicated in the one or more QoS fields of the network packet at node ingress or node egress of the network packet as routed through the nodes arranged to separately provide individual SFs included in the SFC.

Example 4

The apparatus of example 1, the QoS stamping policy may indicate a service flow for which the one or more QoS fields of the network packet are to be monitored.

Example 5

The apparatus of example 1, the one or more QoS fields of the network packet may include one or more fields having QCI bits, IEEE 802.1p bits, DSCP bits or TEID bits.

Example 6

The apparatus of example 1, the individual SFs included in the SFC may include at least two of a firewall SF, a virtual router SF, an NAT SF, an SBC SF, a VO SF or a CDN SF.

Example 7

The apparatus of example 1 may also include a digital display coupled to the circuitry to present a user interface view.

Example 8

An example method may include providing, at a processor circuit, a QoS stamping policy to an SFC classifier to cause the SFC classifier to generate an NSH that includes metadata type 2. The metadata type 2 may include QoS stamping information inserted by nodes separately providing individual SFs included in an SFC. The method may also include accessing a database arranged to store QoS stamping information inserted by the nodes providing individual SFs in the SFC. The QoS stamping information may be gathered according to the QoS stamping policy as the network packet is routed through the nodes. The method may also include determining whether the QoS stamping information indicates a consistent QoS configuration in the one or more QoS fields of the network packet at node ingress or node egress of the network packet as routed through the nodes.

Example 9

The method of example 8 may also include determining that the QoS stamping information indicates an inconsistent QoS configuration in the one or more QoS fields of the network packet. The method may also include identifying which node or nodes have the inconsistent QoS configuration. The method may also include causing an update to the identified node or nodes to correct the inconsistent QoS configuration in the one or more QoS fields of the network packet.

Example 10

The method of example 9, the inconsistent QoS configuration in the one or more QoS fields of the network packet may be different traffic classes indicated in the one or more QoS fields of the network packet at node ingress or node egress of the network packet as routed through the nodes separately providing individual SFs included in the SFC.

Example 11

The method of example 8, the QoS stamping policy may indicate a service flow for which the one or more QoS fields of the network packet are to be monitored.

Example 12

The method of example 8, the one or more QoS fields of the network packet may include one or more fields having QCI bits, IEEE 802.1p bits, DSCP bits or TEID bits.

Example 13

The method of example 8, the individual SFs included in the SFC may include at least two of a firewall SF, a virtual router SF, an NAT SF, an SBC SF, a VO SF or a CDN SF.

Example 14

An example at least one machine readable medium may include a plurality of instructions that in response to being executed by a system may cause the system to carry out a method according to any one of examples 8 to 13.

Example 15

An example apparatus may include means for performing the methods of any one of examples 8 to 13.

Example 16

An example at least one machine readable medium may include a plurality of instructions that in response to being executed by a system at a controller that monitors one or more QoS fields of a network packet routed through nodes arranged to separately provide individual SFs included in an SFC may cause the system to provide a QoS stamping policy to an SFC classifier to cause the SFC classifier to generate an NSH that includes metadata type 2. The metadata type 2 may include QoS stamping information inserted by nodes arranged to separately provide individual SFs included in the SFC. The instructions may also cause the system to access a database arranged to store QoS stamping information inserted by the nodes providing individual SFs in the SFC. The QoS stamping information gathered according to the QoS stamping policy as the network packet is routed through the nodes. The instructions may also cause the system to determine whether the QoS stamping information indicates a consistent QoS configuration in the one or more QoS fields of the network packet at node ingress or node egress of the network packet as routed through the nodes.

Example 17

The at least one machine readable medium of example 16, the instructions may further cause the system to determine that the QoS stamping information indicates an inconsistent QoS configuration in the one or more QoS fields of the network packet. The instructions may also cause the system to identify which node or nodes have the inconsistent QoS configuration cause an update to the identified node or nodes to correct the inconsistent QoS configuration in the one or more QoS fields of the network packet.

Example 18

The at least one machine readable medium of example 16, the inconsistent QoS configuration in the one or more QoS fields of the network packet may include different traffic classes indicated in the one or more QoS fields of the network packet at node ingress or node egress of the network packet as routed through the nodes separately providing individual SFs included in the SFC.

Example 19

The at least one machine readable medium of example 16, the QoS stamping policy may indicate a service flow for which the one or more QoS fields of the network packet are to be monitored.

Example 20

The at least one machine readable medium of example 16, the one or more QoS fields of the network packet may include one or more fields having QCI bits, IEEE 802.1p bits, DSCP bits or TEID bits.

Example 21

The at least one machine readable medium of example 16, the individual SFs included in the SFC may include at least two of a firewall SF, a virtual router SF, an NAT SF, an SBC SF, a VO SF or a CDN SF.

Example 22

An example apparatus may include circuitry at an SFC classifier. The apparatus may also include receive logic for execution by the circuitry to receive a QoS stamping policy for monitoring one or more QoS fields of a network packet routed through nodes separately arranged to provide individual SFs in an SFC. The apparatus may also include generate logic for execution by the circuitry to generate an NSH that includes metadata type 2 based on the QoS stamping policy, the metadata type 2 to include QoS stamping information inserted by nodes arranged to separately provide individual SFs included in the SFC. The apparatus may also include encapsulate logic for execution by the circuitry to encapsulate the network packet with the generated NSH and cause the NSH-encapsulated network packet to be sent to a first node of the nodes arranged to separately provide individual SFs in the SFC.

Example 23

The apparatus of example 22 may also include the generate logic to include a service index in the metadata type 2. The service index may be arranged to be used by the nodes separately arranged to provide individual SFs to determine which node is a last QoS stamping node in the SFC. The generate logic may include a reference time in the metadata type 2. The reference time may indicate a beginning time for monitoring the one or more QoS fields of the network packet.

Example 24

The apparatus of example 23, the service index may have a value that is decremented by successive QoS stamping nodes in the SFC until the service index reaches a value of "1". A QoS stamping node receiving the NSH-encapsulated network packet with a service index value of "1" in the metadata type 2 may enable the QoS stamping node to determine it is the last QoS stamping node in the SFC.

Example 25

The apparatus of example 22, the one or more QoS fields of the network packet may include one or more fields having QCI bits, IEEE 802.1p bits, DSCP bits or TEID bits.

Example 26

The apparatus of example 22, the individual SFs in the SFC may include at least two of a firewall SF, a virtual router SF, an NAT SF, an SBC SF, a VO SF or a CDN SF.

Example 27

The apparatus of example 22 may also include a digital display coupled to the circuitry to present a user interface view.

Example 28

An example method may include receiving, at a processor circuit, a QoS stamping policy for monitoring one or more QoS fields of a network packet routed through nodes separately providing individual SFs in an SFC. The method may also include generating an NSH that includes metadata type 2 based on the QoS stamping policy. The metadata type 2 may include QoS stamping information inserted by nodes arranged to separately provide individual SFs included in the SFC. The method may also include encapsulating the network packet with the generated NSH. The method may also include sending the NSH-encapsulated network packet to a first node of the nodes separately providing individual SFs in the SFC.

Example 29

The method of example 28, the metadata type 2 may include a service index arranged to be used by the nodes separately providing individual SFs to determine which node is a last QoS stamping node in the SFC. The metadata type 2 may also include a reference time indicating a beginning time for monitoring the one or more QoS fields of the network packet.

Example 30

The method of example 29, the service index may have a value that is decremented by successive QoS stamping nodes in the SFC until the service index reaches a value of "1". A QoS stamping node receiving the NSH-encapsulated network packet with a service index value of "1" in the metadata type 2 may enable the QoS stamping node to determine it is the last QoS stamping node in the SFC.

Example 31

The method of example 28, the one or more QoS fields of the network packet may include one or more fields having QCI bits, IEEE 802.1p bits, DSCP bits or TEID bits.

Example 32

The method of example 28, the individual SFs in the SFC may include at least two of a firewall SF, a virtual router SF, an NAT SF, an SBC SF, a VO SF or a CDN SF.

Example 33

An example at least one machine readable medium may include a plurality of instructions that in response to being executed by a system may cause the system to carry out a method according to any one of examples 28 to 32.

Example 34

An example apparatus may include means for performing the methods of any one of examples 28 to 32.

Example 35

An example at least one machine readable medium may include a plurality of instructions that in response to being executed by a system at an SFC classifier cause the system to receive a QoS stamping policy for monitoring one or more QoS fields of a network packet routed through nodes separately providing individual SFs in an SFC. The instructions may also cause the system to generate an NSH that includes metadata type 2 based on the QoS stamping policy. The metadata type 2 may include QoS stamping information inserted by nodes arranged to separately provide individual SFs included in the SFC. The instructions may also cause the system to encapsulate the network packet with the generated NSH. The instructions may also cause the system to send the NSH-encapsulated network packet to a first node of the nodes separately providing individual SFs in the SFC.

Example 36

The at least one machine readable medium of example 35, the metadata type 2 may include a service index arranged to be used by the nodes separately providing individual SFs to determine which node is a last QoS stamping node in the SFC. The metadata type 2 may also include a reference time that indicates a beginning time for monitoring the one or more QoS fields of the network packet.

Example 37

The at least one machine readable medium of example 36, the service index may have a value that is decremented by successive QoS stamping nodes in the SFC until the service index reaches a value of "1". a QoS stamping node receiving the NSH-encapsulated network packet with a service index value of "1" in the metadata type 2 may enable the QoS stamping node to determine it is the last QoS stamping node in the SFC.

Example 38

The at least one machine readable medium of example 35, the one or more QoS fields of the network packet may include one or more fields having QCI bits, IEEE 802.1p bits, DSCP bits or TEID bits.

Example 39

The at least one machine readable medium of example 35, the individual SFs in the SFC may include at least two of a firewall SF, a virtual router SF, an NAT SF, an SBC SF, a VO SF or a CDN SF.

Example 40

An example apparatus may include circuitry at a node providing an SF included in an SFC. The apparatus may also include receive logic for execution by the circuitry to receive a network packet encapsulated with an NSH that includes metadata type 2. The apparatus may also include insert logic for execution by the circuitry to insert QoS stamping information that indicates QoS configuration information for a QoS field of the network packet at ingress or egress of the NETS-encapsulated network packet. The apparatus may also include index logic for execution by the circuitry to determine whether the node is the last node in the SFC. The apparatus may also include forward logic for execution by the circuitry to forward the NETS-encapsulated network packet with the inserted QoS stamp information to a next node arranged to provide a different SF included in the SFC if the node is determined to not be the last node in the SFC.

Example 41

The apparatus of example 40, the index logic may determine whether the node is the last in the SFC based on a value in a service index field included in the metadata type 2 of the NSH. A determination of not being the last node may be based on the value being greater than 1.

Example 42

The apparatus of example 41, the index logic may decrement the value in the service index field before the forward logic forwards the NETS-encapsulated network packet to the next node.

Example 43

The apparatus of example 40, determining whether the node is the last in the SFC may include determining based on a value in a service index field included in the metadata type 2 of the NSH. The node may determine it is the last node based on the value being equal to 1.

Example 44

The apparatus of example 43 may also include strip logic for execution by the circuitry to strip information included in the metadata type 2 from the NSH-encapsulated network packet and cause the information to be sent for storage at a database accessible to an SFC controller, the SFC controller to monitor one or more QoS fields on the network packet for QoS configuration consistency as the network packet was routed through nodes arranged to provide SFs included in the SFC based on the information sent for storage at the database.

Example 45

The apparatus of example 40, the QoS field of the network packet may include QCI bits, IEEE 802.1p bits, DSCP bits or TEID bits.

Example 46

The apparatus of example 40, the SF in the SFC provided by the node may include a firewall SF, a virtual router SF, an NAT SF, an SBC SF, a VO SF or a CDN SF.

Example 47

The apparatus of example 40 may also include a digital display coupled to the circuitry to present a user interface view.

Example 48

An example method may include receiving, at a processor circuit of a node providing an SF included in an SFC, a network packet encapsulated with an NSH that includes metadata type 2. The method may also include inserting QoS stamping information that indicates QoS configuration information for a QoS field of the network packet at ingress or egress of the NETS-encapsulated network packet. The method may also include determining whether the node is the last node in the SFC and forward the NETS-encapsulated network packet with the inserted QoS configuration information to a next node arranged to provide a different SF included in the SFC if the node is determined to not be the last node in the SFC.

Example 49

The method of example 48, determining whether the node is the last in the SFC may include determining based on a value in a service index field included in the metadata type 2 of the NSH. The node may determine it is not the last node based on the value being greater than 1.

Example 50

The method of example 49 may also include decrementing the value in the service index field before forwarding the NETS-encapsulated network packet to the next node.

Example 51

The method of example 48, determining whether the node is the last in the SFC may include determining based on a value in a service index field included in the metadata type 2 of the NSH. The node may determine it is the last node based on the value being equal to 1.

Example 52

The method of example 51 may also include stripping information included in the metadata type 2 from the NSH-encapsulated network packet. The method may also include sending the information for storage to a database accessible to an SFC controller. The SFC controller may monitor one or more QoS fields on the network packet for QoS configuration consistency as the network packet was routed through nodes arranged to provide SFs included in the SFC based on the information sent for storage at the database.

Example 53

The method of example 48, the QoS field of the network packet may include QCI bits, IEEE 802.1p bits, DSCP bits or TEID bits.

Example 54

The method of example 48, the SF in the SFC provided by the node may include a firewall SF, a virtual router SF, an NAT SF, an SBC SF, a VO SF or a CDN SF.

Example 55

At least one machine readable medium may include a plurality of instructions that in response to being executed by a system may cause the system to carry out a method according to any one of examples 48 to 54.

Example 56

An apparatus comprising means for performing the methods of any one of examples 48 to 54.

Example 57

An example at least one machine readable medium may include a plurality of instructions that in response to being executed by a system at a node providing an SF included in an SFC may cause the system to receive a network packet encapsulated with an NSH that includes metadata type 2. The instructions may also cause the system to insert QoS stamping information that indicates QoS configuration information for a QoS field of the network packet at ingress or egress of the NETS-encapsulated network packet. The instructions may also cause the system to determine whether the node is the last node in the SFC and forward the NETS-encapsulated network packet with the inserted QoS configuration information to a next node arranged to provide a different SF included in the SFC if the node is determined to not be the last node in the SFC.

Example 58

The at least one machine readable medium of example 57, the system to determine whether the node is the last in the SFC may include the system to determine based on a value in a service index field included in the metadata type 2 of the NSH. The system may determine the node is not the last node based on the value being greater than 1.

Example 59

The at least one machine readable medium of example 58, the instructions to further cause the system to decrement the value in the service index field before the NHS-encapsulated network packet is forwarded to the next node.

Example 60

The at least one machine readable medium of example 57, the system to determine whether the node is the last in the SFC may include the system to determine based on a value in a service index field included in the metadata type 2 of the NSH. The system may determine the node is the last node based on the value being equal to 1.

Example 61

The at least one machine readable medium of example 60, the instructions may further cause the system to strip information included in the metadata type 2 from the NSH-encapsulated network packet. The instructions may also cause the system to send the information for storage to a database accessible to an SFC controller, the SFC controller to monitor one or more QoS fields on the network packet for QoS configuration consistency as the network packet was routed through nodes arranged to provide SFs included in the SFC based on the information sent for storage at the database.

Example 62

The at least one machine readable medium of example 57, the QoS field of the network packet may include QCI bits, IEEE 802.1p bits, DSCP bits or TEID bits.

Example 63

The at least one machine readable medium of example 57, the SF in the SFC provided by the node may include a firewall SF, a virtual router SF, an NAT SF, an SBC SF, a VO SF or a CDN SF.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
   circuitry at a controller that monitors one or more quality of service (QoS) fields of a network packet routed through nodes arranged to separately provide individual service functions (SFs) included in a service function chain (SFC);
   policy logic for execution by the circuitry to provide a QoS stamping policy to an SFC classifier to cause the SFC classifier to generate a network service header (NSH) that includes metadata type 2, the metadata type 2 to include QoS stamping information inserted by nodes arranged to separately provide individual SFs included in the SFC;
   access logic for execution by the circuitry to access a database arranged to store QoS stamping information inserted by the nodes separately arranged to provide individual SFs in the SFC, the QoS stamping information gathered according to the QoS stamping policy as the network packet is routed through the nodes; and
   consistency logic for execution by the circuitry to determine whether the QoS stamping information indicates a consistent QoS configuration in the one or more QoS fields of the network packet at node ingress or node egress of the network packet as routed through the nodes.

2. The apparatus of claim 1, comprising:
   the consistency logic to determine that the QoS stamping information indicates an inconsistent QoS configuration in the one or more QoS fields of the network packet and identify which node or nodes have the inconsistent QoS configuration; and
   update logic for execution by the circuitry to cause an update to the identified node or nodes to correct the inconsistent QoS configuration in the one or more QoS fields of the network packet.

3. The apparatus of claim 2, the inconsistent QoS configuration in the one or more QoS fields of the network packet comprises different traffic classes indicated in the one or more QoS fields of the network packet at node ingress or node egress of the network packet as routed through the nodes arranged to separately provide individual SFs included in the SFC.

4. The apparatus of claim 1, comprising the QoS stamping policy to indicate a service flow for which the one or more QoS fields of the network packet are to be monitored.

5. The apparatus of claim 1, the one or more QoS fields of the network packet include one or more fields having QoS class identifier (QCI) bits, Institute of Electrical and Electronics Engineers (IEEE) 802.1p bits, differentiated services code point (DSCP) bits or tunnel endpoint ID (TEID) bits.

6. The apparatus of claim 1, the individual SFs included in the SFC comprise at least two of a firewall SF, a virtual router SF, a network address translation (NAT) SF, a session border controller (SBC) SF, a video-optimizer (VO) SF or a content distribution network (CDN) SF.

7. The apparatus of claim 1, comprising a digital display coupled to the circuitry to present a user interface view.

8. At least one non-transitory machine readable medium comprising a plurality of instructions that in response to being executed by a system at a controller that monitors one or more quality of service (QoS) fields of a network packet routed through nodes arranged to separately provide individual service functions (SFs) included in a service function chain (SFC) cause the system to:
   provide a QoS stamping policy to an SFC classifier to cause the SFC classifier to generate a network service header (NSH) that includes metadata type 2, the metadata type 2 to include QoS stamping information inserted by nodes arranged to separately provide individual SFs included in the SFC;
   access a database arranged to store QoS stamping information inserted by the nodes providing individual SFs in the SFC, the QoS stamping information gathered according to the QoS stamping policy as the network packet is routed through the nodes; and
   determine whether the QoS stamping information indicates a consistent QoS configuration in the one or more QoS fields of the network packet at node ingress or node egress of the network packet as routed through the nodes.

9. The at least one non-transitory machine readable medium of claim 8, the instructions to further cause the system to:
   determine that the QoS stamping information indicates an inconsistent QoS configuration in the one or more QoS fields of the network packet;
   identify which node or nodes have the inconsistent QoS configuration; and
   cause an update to the identified node or nodes to correct the inconsistent QoS configuration in the one or more QoS fields of the network packet.

10. The at least one non-transitory machine readable medium of claim 8, the inconsistent QoS configuration in the one or more QoS fields of the network packet comprises different traffic classes indicated in the one or more QoS fields of the network packet at node ingress or node egress of the network packet as routed through the nodes separately providing individual SFs included in the SFC.

11. The at least one non-transitory machine readable medium of claim 8, comprising the QoS stamping policy to indicate a service flow for which the one or more QoS fields of the network packet are to be monitored.

12. The at least one non-transitory machine readable medium of claim 8, the one or more QoS fields of the network packet include one or more fields having QoS class identifier (QCI) bits, Institute of Electrical and Electronics Engineers (IEEE) 802.1p bits, differentiated services code point (DSCP) bits or tunnel endpoint ID (TED) bits.

13. The at least one non-transitory machine readable medium of claim 8, the individual SFs included in the SFC comprise at least two of a firewall SF, a virtual router SF, a network address translation (NAT) SF, a session border controller (SBC) SF, a video-optimizer (VO) SF or a content distribution network (CDN) SF.

14. A method comprising:
receiving, at a processor circuit, a quality of service (QoS) stamping policy for monitoring one or more QoS fields of a network packet routed through nodes separately providing individual service functions (SFs) in a service function chain (SFC);
generating a network service header (NSH) that includes metadata type 2 based on the QoS stamping policy, the metadata type 2 to include QoS stamping information inserted by nodes arranged to separately provide individual SFs included in the SFC;
encapsulating the network packet with the generated NSH; and
sending the NSH-encapsulated network packet to a first node of the nodes separately providing individual SFs in the SFC.

15. The method of claim 14, comprising the metadata type 2 including:
a service index arranged to be used by the nodes separately providing individual SFs to determine which node is a last QoS stamping node in the SFC; and
a reference time indicating a beginning time for monitoring the one or more QoS fields of the network packet.

16. The method of claim 15, comprising the service index having a value that is decremented by successive QoS stamping nodes in the SFC until the service index reaches a value of "1", a QoS stamping node receiving the NSH-encapsulated network packet with a service index value of "1" in the metadata type 2 enables the QoS stamping node to determine it is the last QoS stamping node in the SFC.

17. The method of claim 14, the one or more QoS fields of the network packet include one or more fields having QoS class identifier (QCI) bits, Institute of Electrical and Electronics Engineers (IEEE) 802.1p bits, differentiated services code point (DSCP) bits or tunnel endpoint ID (TED) bits.

18. The method of claim 14, the individual SFs in the SFC comprise at least two of a firewall SF, a virtual router SF, a network address translation (NAT) SF, a session border controller (SBC) SF, a video-optimizer (VO) SF or a content distribution network (CDN) SF.

19. An apparatus comprising:
circuitry at a node providing a service function (SF) included in a service function chain (SFC);
receive logic for execution by the circuitry to receive a network packet encapsulated with a network service header (NSH) that includes metadata type 2;
insert logic for execution by the circuitry to insert quality of service (QoS) stamping information that indicates QoS configuration information for a QoS field of the network packet at ingress or egress of the NSH-encapsulated network packet;
index logic for execution by the circuitry to determine whether the node is the last node in the SFC; and
forward logic for execution by the circuitry to forward the NSH-encapsulated network packet with the inserted QoS stamp information to a next node arranged to provide a different SF included in the SFC if the node is determined to not be the last node in the SFC.

20. The apparatus of claim 19, comprising the index logic to determine whether the node is the last in the SFC based on a value in a service index field included in the metadata type 2 of the NSH, wherein a determination of not being the last node is based on the value being greater than 1.

21. The apparatus of claim 20, comprising the index logic to decrement the value in the service index field before the forward logic forwards the NSH-encapsulated network packet to the next node.

22. The apparatus of claim 19, determining whether the node is the last in the SFC comprises determining based on a value in a service index field included in the metadata type 2 of the NSH, wherein the node is to determine it is the last node based on the value being equal to 1.

23. The apparatus of claim 22, comprising:
strip logic for execution by the circuitry to strip information included in the metadata type 2 from the NSH-encapsulated network packet and cause the information to be sent for storage at a database accessible to an SFC controller, the SFC controller to monitor one or more QoS fields on the network packet for QoS configuration consistency as the network packet was routed through nodes arranged to provide SFs included in the SFC based on the information sent for storage at the database.

24. The apparatus of claim 19, the QoS field of the network packet includes QoS class identifier (QCI) bits, Institute of Electrical and Electronics Engineers (IEEE) 802.1p bits, differentiated services code point (DSCP) bits or tunnel endpoint ID (TED) bits.

25. The apparatus of claim 19, the SF in the SFC provided by the node comprises a firewall SF, a virtual router SF, a network address translation (NAT) SF, a session border controller (SBC) SF, a video-optimizer (VO) SF or a content distribution network (CDN) SF.

26. At least one non-transitory machine readable medium comprising a plurality of instructions that in response to being executed by a system at a node providing a service function (SF) included in a service function chain (SFC) cause the system to:
receive a network packet encapsulated with a network service header (NSH) that includes metadata type 2;
insert quality of service (QoS) stamping information that indicates QoS configuration information for a QoS field of the network packet at ingress or egress of the NSH-encapsulated network packet; and
determine whether the node is the last node in the SFC and forward the NSH-encapsulated network packet with the inserted QoS configuration information to a next node arranged to provide a different SF included in the SFC if the node is determined to not be the last node in the SFC.

27. The at least one non-transitory machine readable medium of claim 26, the system to determine whether the node is the last in the SFC comprises the system to determine based on a value in a service index field included in the metadata type 2 of the NSH, wherein the system is to determine the node is the last node based on the value being equal to 1.

28. The at least one machine readable medium of claim 27, comprising the instructions to further cause the system to:
strip information included in the metadata type 2 from the NSH-encapsulated network packet;
send the information for storage to a database accessible to an SFC controller, the SFC controller to monitor one or more QoS fields on the network packet for QoS configuration consistency as the network packet was routed through nodes arranged to provide SFs included in the SFC based on the information sent for storage at the database.

29. The at least one non-transitory machine readable medium of claim 26, the SF in the SFC provided by the node comprises a firewall SF, a virtual router SF, a network address translation (NAT) SF, a session border controller (SBC) SF, a video-optimizer (VO) SF or a content distribution network (CDN) SF.

* * * * *